(12) United States Patent
Montojo et al.

(10) Patent No.: US 7,251,229 B2
(45) Date of Patent: Jul. 31, 2007

(54) SYSTEMS AND TECHNIQUES FOR MEASURING RELATIVE POWER

(75) Inventors: Juan Montojo, San Diego, CA (US); Peter J. Black, San Diego, CA (US); Nagabhushana T. Sindhushayana, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 895 days.

(21) Appl. No.: 09/924,307

(22) Filed: Aug. 6, 2001

(65) Prior Publication Data

US 2003/0076798 A1    Apr. 24, 2003

(51) Int. Cl.
*H04B 7/216*     (2006.01)
*H04J 3/12*      (2006.01)

(52) U.S. Cl. .................. 370/335; 342/395.21
(58) Field of Classification Search ........... 370/320, 370/321, 342, 343, 335, 345, 395.21, 522, 370/243; 455/67.11, 69, 522, 561
See application file for complete search history.

(56) References Cited

U.S. PATENT DOCUMENTS

| | | | |
|---|---|---|---|
| 5,056,109 A * | 10/1991 | Gilhousen et al. | 370/342 |
| 6,191,738 B1 * | 2/2001 | Pfeil et al. | 342/457 |
| 6,191,739 B1 * | 2/2001 | Gabber et al. | 342/458 |
| 6,466,561 B1 * | 10/2002 | Lee et al. | 370/335 |
| 6,496,536 B2 * | 12/2002 | Mollenkopf | 375/227 |
| 6,842,624 B2 * | 1/2005 | Sarkar et al. | 455/522 |
| 6,862,457 B1 * | 3/2005 | Sarkar et al. | 455/522 |

* cited by examiner

*Primary Examiner*—Afsar Qureshi
(74) *Attorney, Agent, or Firm*—Thomas R. Rouse; Charles D. Brown; Christopher O. Edwards (57) ABSTRACT

Systems and techniques for a signal having a first set of channels separated in a first format, and a second set of channels separated in a second format wherein a first parameter for a first one of the channels from the first set is measured, a second parameter from a second one of the first channels is measured, and the relative power between the first one of the channels and the second one of the channels from the first set of channels can be computed. The foregoing abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

74 Claims, 5 Drawing Sheets

SYSTEMS AND TECHNIQUES FOR MEASURING RELATIVE POWER

BACKGROUND

1. Field

The present invention relates generally to communications systems, and more specifically, to systems and techniques to measure relative power levels of channel allocations in transmitting devices.

2. Background

Recently, communications systems have been developed to allow the transmission of signals from an origination station to a physically distinct destination station. In transmitting signals from the origination station over a communication link, the signal is first converted into a form suitable for efficient transmission over the communication link. As used herein, the communication link comprises a media, over which a signal is transmitted. Conversion, or modulation, of the signal involves varying a parameter of a carrier wave in accordance with the signal in such a way that the spectrum of the resulting modulated carrier is confined within the communication link bandwidth. At the destination station, the original signal is replicated from a version of the modulated carrier received over the communication link. Such a replication is generally achieved by using an inverse of the modulation process employed by the origination station.

Modulation also facilitates multiple-access, i.e., simultaneous transmission and/or reception, of several signals over a common communication link. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communication link. The channel allocations can take on various forms depending on the specific multi-access technique. By way of example, in FDMA systems, the total frequency spectrum is divided into a number of smaller sub-bands and each user is given its own sub-band to access the communication link. Alternatively, in TDMA systems, each user is given the entire frequency spectrum during periodically recurring time slots. In CDMA systems, each user is given the entire frequency spectrum for all of the time but distinguishes its transmission through the use of a unique pseudo-random code.

To minimize interference between channel allocations in multiple-access environments, various regulatory bodies have promulgated minimum performance standards for communications devices. Some multi-access schemes require that the transmission power for each channel be substantially the same. To ensure compliance with this requirement, numerous methodologies have been developed to measure the relative power levels of different channel allocations. Heretofore, relative power measurements in TDMA systems have been made using a spectrum analyzer set to the time domain. The spectrum analyzer has also been used to measure relative power levels in FDMA systems with the spectrum analyzer set to the frequency domain.

Relative power measurements in CDMA systems generally require that the desired channels be recovered from those undesired channels that share the same frequency spectrum. Channel recovery is made possible by transmitting each signal with a different pseudo-random binary sequence that modulates a carrier, and thereby, spreads the spectrum of the signal waveform. The transmitted signals are separated in the receiver by a correlator that uses a corresponding pseudo-random binary sequence to despread the desired signal's spectrum. The undesired signals, whose pseudo-random binary sequence do not match, are not despread in bandwidth and contribute only to noise.

Code domain power coefficient ($\rho_i$) calculations can be useful for despreading the spectrum of the CDMA channels of interest as well as measuring their relative power levels. The code domain power coefficient ($\rho_i$) is defined as the normalized ratio of the power of the actual waveform generated by the CDMA transmitter that correlates with the ideal waveform when modulated by the CDMA channel of interest and can be expressed as follows:

$$\rho_i = \frac{\left| \sum_{k=1}^{N} z_k \cdot r_{i,k}^* \right|^2}{\left\{ \sum_{k=1}^{N} |z_k|^2 \right\} \cdot \left\{ \sum_{k=1}^{N} |r_{i,k}|^2 \right\}} \quad (1)$$

where:
  i corresponds to the $i^{th}$ CDMA channel;
  $z_k = z[k]$ which is the $k^{th}$ sample of the actual waveform;
  $r_{i,k} = r_i[k]$ which is the $k^{th}$ sample of the ideal waveform spread by the pseudo-random code for the $i^{th}$ CDMA channel;
  N = the number of samples; and
  [ ]* represents the complex conjugate.

The dot-product in the numerator between the actual waveform generated by the CDMA transmitter and the ideal waveform effectively despreads the spectrum of the signal for the CDMA channel of interest when the number of samples M is a multiple of the period of the spreading code. The denominator of equation (1) normalizes the computation. The difference in the code domain power coefficients for the CDMA channels of interest provides an indication of the difference in power.

Notwithstanding the existing methodologies for measuring the relative power of channel allocations in different multi-access schemes, the implementation of a common way for measuring the relative power of channels for different multi-access schemes is desirable. This is particularly true as more complex multi-access schemes become commonplace. By way of example, a CDMA system can be a hybrid of FDMA and CDMA techniques where the total system bandwidth is divided into a set of wideband channels, each of which contains several CDMA channels. Alternatively, the CDMA system can be a hybrid of TDMA and CDMA techniques where several CDMA channels are assigned to periodically recurring time slots, or one or more CDMA channels are partitioned into several TDMA channels. Based on hybrid channelization of the waveforms, relative power measurements using code domain power coefficients ($\rho_i$) may yield inaccurate results when several TDMA channels are contained in a single CDMA channel. The potential inaccuracy results from the normalization of the cross-correlated value between the actual waveform generated by the CDMA transmitter and the ideal waveform. Accordingly, there is a need for a more generalized methodology for measuring relative power that can be applied to a variety of different multi-access schemes.

SUMMARY

In one aspect of the present invention, a method of monitoring a signal having a first plurality of channels separated in a first format, and a second plurality of channels separated in a second format different from the first format, includes measuring a first parameter of a first one of the first channels, measuring a second parameter of a second one of the first channels, and computing relative power between the first one of the first channels and the second one of the first channels as a function of the first and second parameters.

In another aspect of the present invention, a power measurement device includes a processor configured to receive first and second waveforms, measuring a first parameter as a function of the first and second waveforms over a first time period, measuring a second parameter as a function of the first and second waveforms over a second time period, and compute relative power of the first waveform between the first and second time periods.

In yet another aspect of the present invention, a power measurement device includes a processor configured to receive a signal having a first plurality of channels separated in a first format, and a second plurality of channels separated in a second format different from the first format, the processor further configured to measure a first parameter of a first one of the first channels, measure a second parameter of a second one of the first channels, and computing relative power between the first one of the first channels and the second one of the first channels as a function of the first and second parameters.

In a further aspect of the present invention, a method of measuring power includes measuring a first parameter as a function of first and second waveforms over a first time period, measuring a second parameter as a function of the first and second waveforms over a second time period, and computing relative power of the first waveform between the first and second time periods.

In yet a further aspect of the present invention, computer-readable media embodying a program of instructions executable by a computer performs a method of monitoring a signal having a first plurality of channels separated in a first format, and a second plurality of channels separated in a second format different from the first format, the method including measuring a first parameter of a first one of the first channels, measuring a second parameter of a second one of the first channels, and computing relative power between the first one of the first channels and the second one of the first channels as a function of the first and second parameters.

In another aspect of the present invention, a power measurement device includes first measurement means for measuring a first parameter as a function of the first and second waveforms over a first time period, second measurement means for measuring a second parameter as a function of the first and second waveforms over a second time period, and computation means for compute relative power of the first waveform between the first and second time periods.

In yet another aspect of the present invention, a power measurement device includes receiving means for receiving a signal having a first plurality of channels separated in a first format, and a second plurality of channels separated in a second format different from the first format, first measurement means for measuring a first parameter of a first one of the first channels, second measurement means for measuring a second parameter of a second one of the first channels, and computation means for computing relative power between the first one of the first channels and the second one of the first channels as a function of the first and second parameters.

In a further aspect of the present invention, computer-readable media embodying a program of instructions executable by a computer performs a method of measuring power, the method including measuring a first parameter as a function of first and second waveforms over a first time period, measuring a second parameter as a function of the first and second waveforms over a second time period, and computing relative power of the first waveform between the first and second time periods.

It is understood that other embodiments of the present invention will become readily apparent to those skilled in the art from the following detailed description, wherein it is shown and described only embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

In an exemplary embodiment of a communications system, relative power between channel allocations of a transmitting device can be measured. The methodology for measuring the relative power of the channel allocations can be tailored to specific applications and different multi-access channel structures. In the context of a communications system utilizing a multi-access hybrid channel structure, the relative power of channel allocations can be measured by computing a modified version of the code domain power coefficients ($\rho_i$). Since the code domain power coefficients ($\rho_1$) are often useful for computing other waveform quality measurements, a modified version of the code domain power coefficients may reduce computational complexity. The aforementioned modification entails computing the ratio of the unnormalized cross-correlated value ($\xi$) between the actual waveform and the ideal waveform. This computation can be applied to various multi-access hybrid channel structures as well as conventional multi-access channel structures, including by way of example, CDMA, TDMA and FDMA. Accordingly, any reference to relative power measurements in the context of a specific multi-access channel structure is intended only to illustrate the inventive aspects of the present invention, such aspects being applicable to a wide variety of communications systems.

Figure 1:
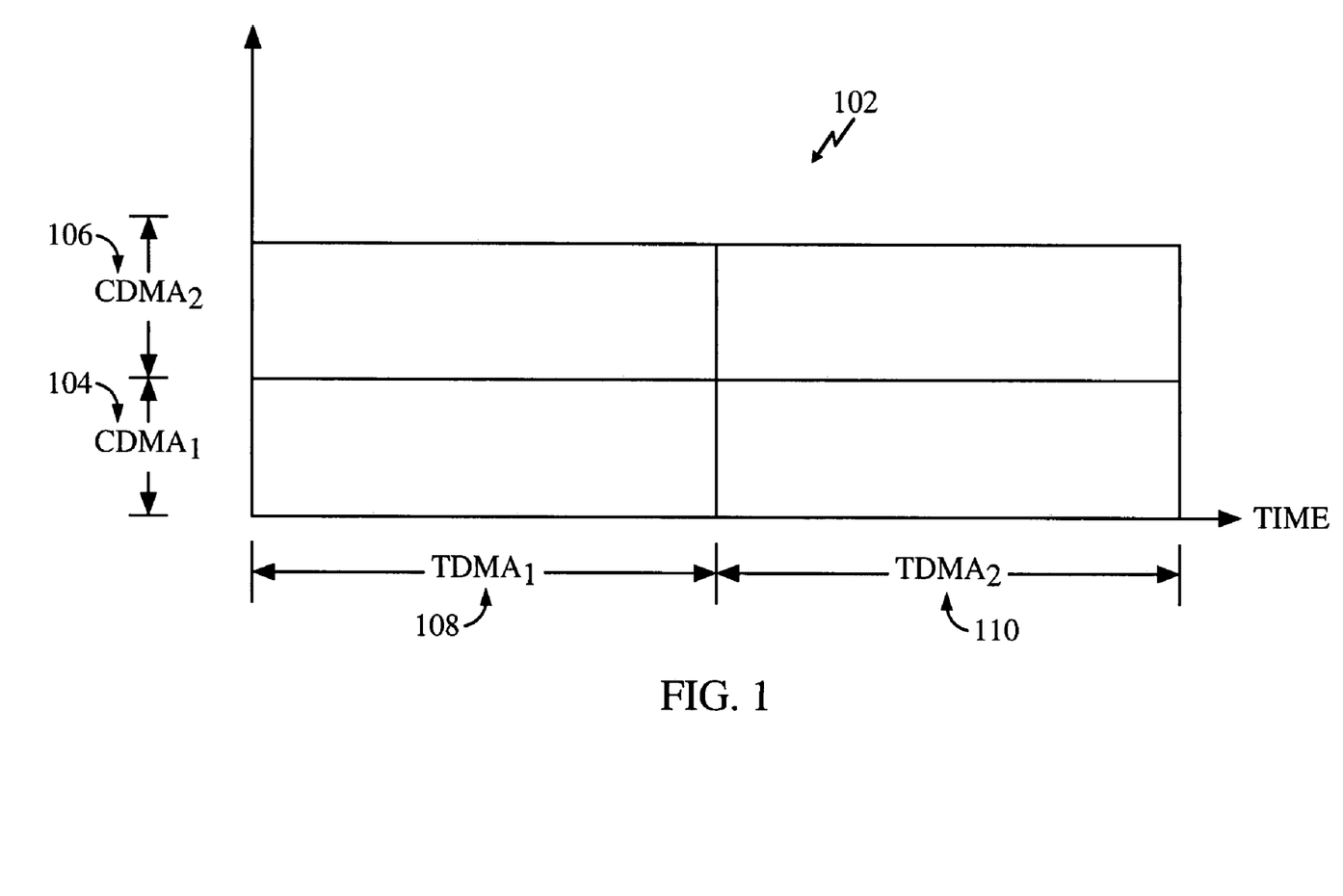
FIG. 1 is a timing diagram of an exemplary ideal waveform for a multi-access hybrid channel structure in the code and time domain.

FIG. 1 illustrates an exemplary ideal waveform 102 being partitioned into a multi-access hybrid channel structure in the code and time domain. The ideal waveform 102 is sliced horizontally to form two CDMA channels, $CDMA_1$ 104 and $CDMA_2$ 106. In either the frequency or time domain, the CDMA channels appear to be on top of each other. In the exemplary ideal waveform shown, the CDMA channels are shown in the time domain, however, those skilled in the art will appreciate that the inventive concepts described herein are equally applicable to the frequency domain. The ideal waveform 102 is further sliced vertically to form two TDMA time slots, $TDMA_1$ 108 and $TDMA_2$ 110.

Figure 2:
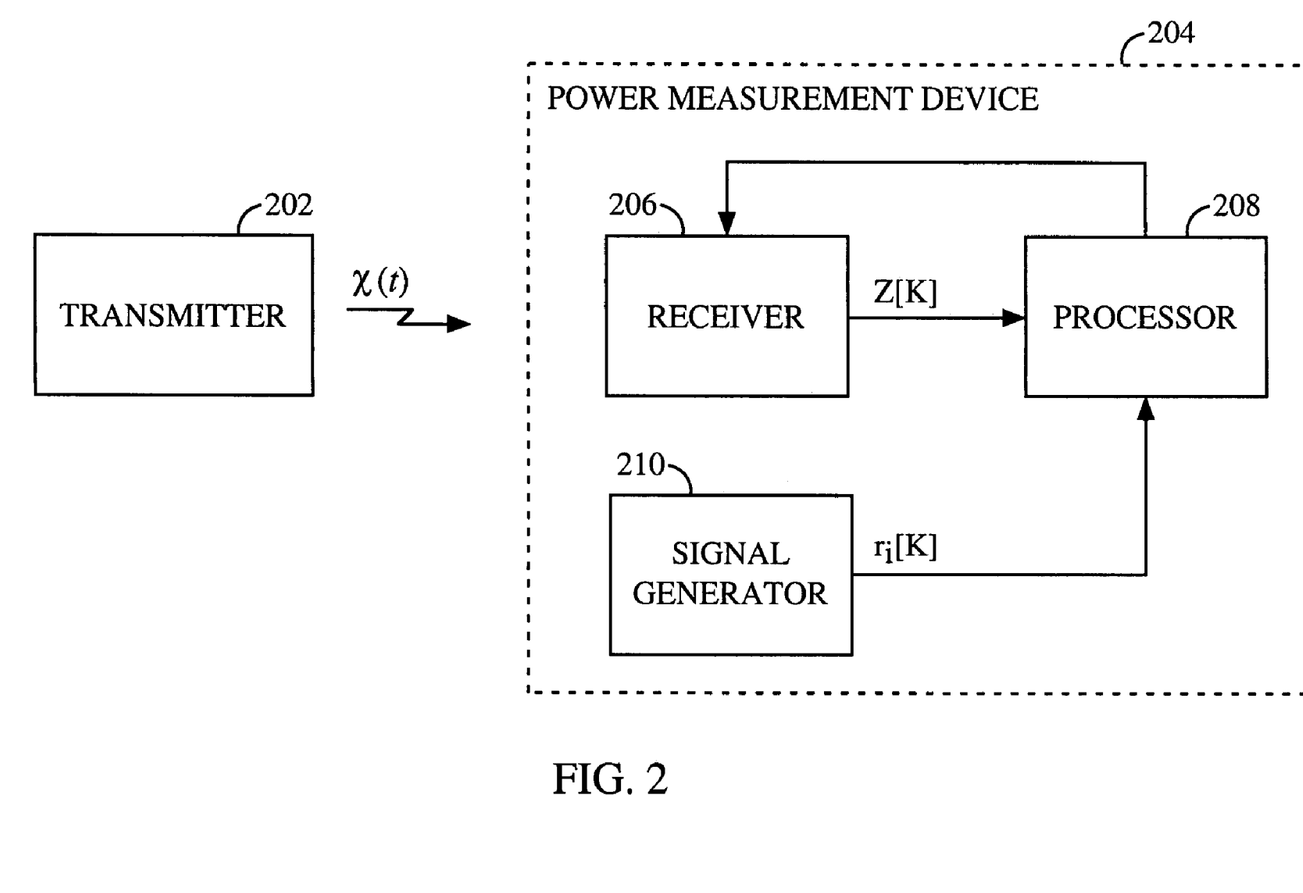
FIG. 2 is a functional block diagram of a transmitter under test with an exemplary power measurement device.

A generalized functional diagram of an exemplary transmitting device under test is shown in FIG. 2. In the described exemplary embodiment, a transmitter 202 generates an actual signal having a multi-access hybrid channel structure that corresponds to the ideal waveform shown in FIG. 1. The actual waveform is quadrature spread, baseband filtered and upconverted on a carrier frequency by the transmitter 202.

The resulting modulated actual waveform x(t) output from the transmitter can be coupled to an exemplary power measurement device 204. A receiver 206 positioned at the front end of the power measurement device 204 samples the modulated actual waveform x(t) at ideal sampling points. The discrete time samples z[k] of the actual waveform generated by the receiver 206 can be coupled to a processor 208. A signal generator 210 can be used to generate discrete time samples $r_i[k]$ of a corresponding ideal waveform for the CDMA channel of interest. By way of example, the relative power between $TDMA_1$ 108 and $TDMA_2$ 110 for the first CDMA channel $CDMA_1$ 104 can be measured by generating discrete time samples $r_i[k]$ of the ideal waveform spread by its respective pseudo-random code for the first CDMA channel $CDMA_1$ 104 (see FIG. 1). The discrete time samples $r_i[k]$ of the ideal waveform generated by the signal generator 210 are also coupled to the processor 208. The processor 208 uses the discrete time samples z[k] of the actual waveform generated by the receiver 206 and the discrete time samples $r_i[k]$ of the corresponding ideal waveform from the signal generator 210 to measure the relative power between the TDMA channels.

In at least one embodiment, the processor 208 can be configured to compute residual frequency, time, and phase offsets between the actual waveform and the ideal waveform and feed the computed offsets back to the receiver 206 to track changes due to drift in the transmitter 202. The frequency, time, and phase offsets can be computed in a variety of ways. By way of example, the processor 208 can sweep through a range of frequency, time, and phase offsets and determine which combination renders the optimal result in terms of power measurements. Alternatively, conventional synchronization and tracking loops can be used to track the frequency, time, and phase offsets.

Figure 3:
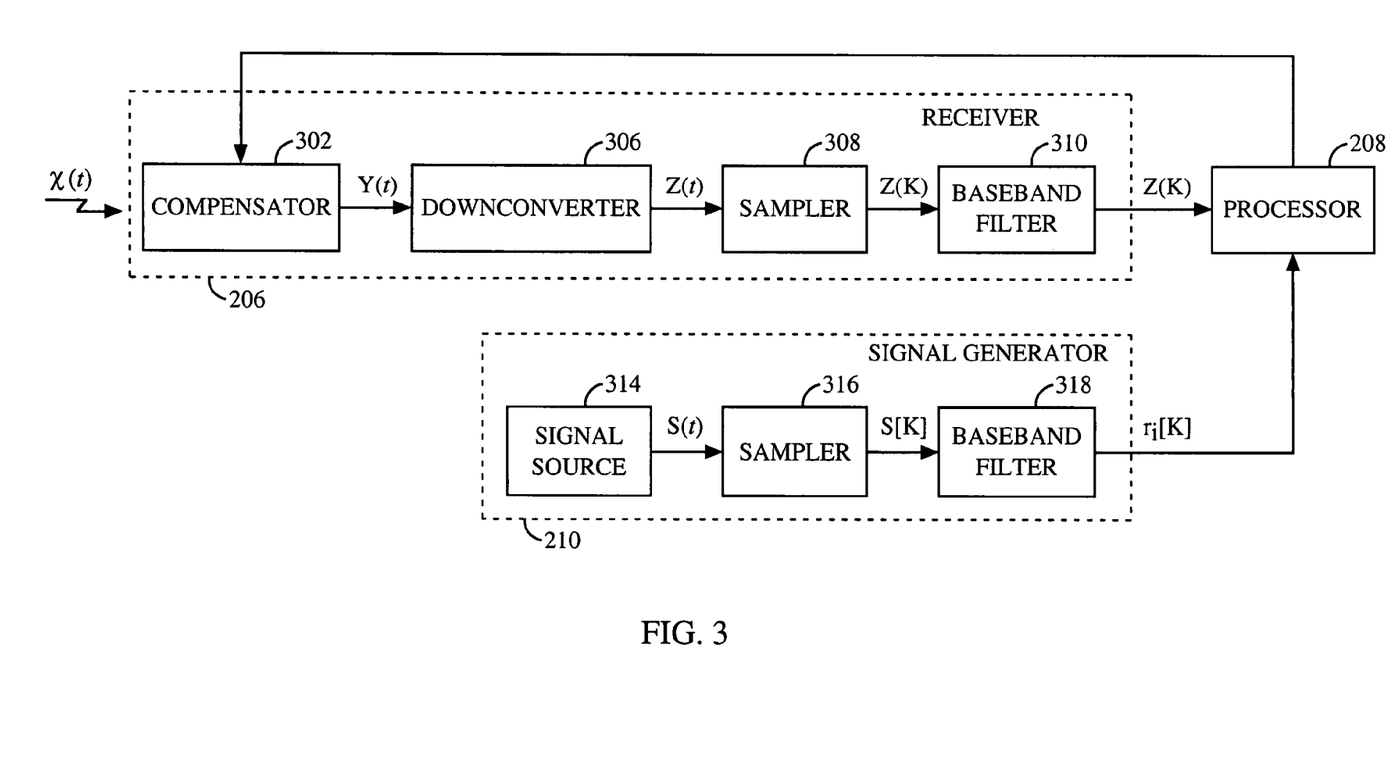
FIG. 3 is a functional block diagram of an exemplary power measurement device.

FIG. 3 is an exemplary embodiment of the power measurement device of FIG. 2. The receiver 206 may include a compensator 302 at the front end. The compensator 302 is configured to receive a modulated actual waveform x(t) from a transmitter (not shown). The compensator 302 can also be provided with estimates of frequency, time, and phase offsets of the actual waveform x(t) with respect to an ideal waveform from the processor 208. The compensator 302 uses the offset estimates to generate a compensated waveform y(t). The compensated waveform y(t) can be coupled to a downconverter 306. The downconverter 306 converts the compensated waveform y(t) to a baseband waveform z(t). The baseband waveform z(t) from the downconverter 306 can be coupled to a sampler 308. The sampler 308 samples the baseband signal z(t) to generate discrete time samples z[k]. The discrete time samples can be generated by sampling the waveform z(t) at ideal sampling points to generate z[k]. The discrete time samples z[k] from the sampler 308 can be coupled to a baseband filter 310. The baseband filter 310 is used to remove inter-symbol interference (ISI) introduced by the transmitter filter. To accomplish this, the transfer function of the baseband filter 310 is an inverse complex conjugate of the transfer function of the ideal transmitter filter. The output waveform z[k] from the baseband filter 310 can be coupled to the processor 208.

The exemplary signal generator 210 can generate the discrete time samples $r_i[k]$ of the ideal waveform in a variety of ways. In one embodiment, an ideal waveform s(t) is generated by a signal source 314. The ideal waveform s(t) can be modulated on a carrier frequency, or alternatively be generated at baseband. In the described exemplary embodiment, the signal source 314 outputs the ideal waveform at baseband. This approach eliminates the need for a downconverter in the signal generator 210. The ideal waveform s(t) generated by the signal source 314 can be provided to a sampler 316. The sampler 316 samples the baseband waveform s(t) to generate discrete time samples s[k]. The discrete time samples s[k] from the sampler 316 can be coupled to a baseband filter 318. The baseband filter 318 is used to remove inter-symbol interference (ISI) introduced by the signal source 314. The output waveform $r_i[k]$ from the baseband filter 318 can be coupled to the processor 208.

In an alternative approach, the signal source 314 can generate the discrete time samples for the ideal waveform $r_i[k]$ directly. With this approach the signal source 314 can be coupled directly to the processor 208 eliminating the need for the sampler 316 and the baseband filter 318 in the signal generator 210. In yet another approach, the sampling of the ideal waveform s(t) and the baseband filtering can be performed in the processor 208 eliminating the need for the sampler 316 and the baseband filter 318 in the signal generator 210. Likewise, the sampling of the actual waveform z(t) and the baseband filtering can be performed in the processor 208 eliminating the need for the sampler 308 and the baseband filter 310 in the receiver 206. The specific implementation of the power measurement device will often depend upon the specific application, the overall design constraints imposed on the system, or other applicable factors.

Although the exemplary embodiments of the power measurement device have been described thus far to operate on an actual waveform that is quadrature spread, baseband filtered and upconverted on a carrier frequency, those skilled in the art will be able to modify the power measurement device to accommodate different signal transmissions. By way of example, if the actual waveform from a transmitting device is a digital baseband signal, the downconverter 306 and the sampler 308 in the receiver 206 can be omitted. In addition, if the digital baseband signal from the transmitter has not been filtered, the baseband filter in the receiver 206 can also be omitted. Furthermore, one skilled in the art will be able to modify the power measurement device according to different types of measurements to be performed. By way of example, if the effect of the transmitter filter is to be ascertained, the baseband filters 310 and 318 would be omitted, and the actual waveform and the ideal waveform from samplers 308 and 316 would be coupled directly to the processor 208.

The algorithm implemented by the processor 208 to measure the relative power between TDMA channels may take on various forms depending on the type of transmitter under test, the multi-access channel structure, the testing criteria, or other relevant factors. In at least one embodiment, the processor can execute an algorithm to measure the relative power by first computing the ratio of the unnormalized cross-correlated value ($\xi$) between the actual waveform and the ideal waveform for the TDMA channels of interest. The unnormalized cross-correlated value for each TDMA channel between the ideal waveform referred to in FIG. 1 and the corresponding actual waveform can be expressed as:

$$\xi_i^{Ch1} = \rho_i^{Ch1} \cdot \sum_{k=1}^{M_1} |z_k^{Ch1}|^2 \text{ and } \xi_i^{Ch2} = \rho_i^{Ch2} \cdot \sum_{k=1}^{M_2} |z_k^{Ch2}|^2 \quad (2)$$

where $\rho_i^{Ch1}$ is defined as:

$$\rho_i^{Ch1} = \frac{\left|\sum_{k=1}^{M_1} z_k^{Ch1} \cdot r_{i,k}^{Ch1*}\right|^2}{\left\{\sum_{k=1}^{M_1} |z_k^{Ch1}|^2\right\} \cdot \left\{\sum_{k=1}^{M_1} |r_{i,k}^{Ch1}|^2\right\}} \quad (3)$$

and where $\rho_i^{Ch2}$ is defined as:

$$\rho_i^{Ch2} = \frac{\left|\sum_{k=1}^{M_2} z_k^{Ch2} \cdot r_{i,k}^{Ch2*}\right|^2}{\left\{\sum_{k=1}^{M_2} |z_k^{Ch2}|^2\right\} \cdot \left\{\sum_{k=1}^{M_2} |r_{i,k}^{Ch2}|^2\right\}} \quad (4)$$

From equations (3) and (4), equation (2) can be rewritten as:

$$\xi_i^{Ch1} = \frac{\left|\sum_{k=1}^{M_1} z_k^{Ch1} \cdot r_{i,k}^{Ch1*}\right|^2}{\sum_{k=1}^{M_1} |r_{i,k}^{Ch1}|^2} \text{ and } \xi_i^{Ch2} = \frac{\left|\sum_{k=1}^{M_2} z_k^{Ch2} \cdot r_{i,k}^{Ch2*}\right|^2}{\sum_{k=1}^{M_2} |r_{i,k}^{Ch2}|^2} \quad (5)$$

where:

$M_1$ and $M_2$ are the number of samples for their respective channels and are each a multiple of the period of the spreading code; and $z_k^{Ch1}$ and $z_k^{Ch2}$ are defined by a gating function $g[k]$ as follows:

$$z_k^{Ch1} = z[k] \cdot g^{Ch1}[k], \quad (6)$$

$$z_k^{Ch2} = z[k] \cdot g^{Ch2}[k]; \text{ and}$$

$r_{i,k}^{Ch1}$ and $r_{i,k}^{Ch2}$ are defined by the gating function $g[k]$ as follows:

$$r_{i,k}^{Ch1} = r_i[k] \cdot g^{Ch1}[k], \text{ and} \quad (7)$$

$$r_{i,k}^{Ch2} = r_i[k] \cdot g^{Ch2}[k];$$

where $g^{Ch1}[k]$ and $g^{Ch2}[k]$ can be defined as follows:

$$g^{Ch1}[k] = \begin{cases} 1 & \text{if } a \leq (k \bmod L) \leq b \\ 0 & \text{elsewhere} \end{cases} \quad (8)$$

$$g^{Ch2}[k] = \begin{cases} 1 & \text{if } b \leq (k \bmod L) \leq c \\ 0 & \text{elsewhere} \end{cases}$$

where:

$a \leq (k \bmod L) \leq b$ represents the interval where the waveform is nonzero for the first TDMA channel $TDMA_1$;

$b \leq (k \bmod L) \leq c$ represents the interval where the waveform is nonzero for the second TDMA channel $TDMA_2$; and L is the interval of an elementary unit of the signal $z[k]$.

From an implementation standpoint, those skilled in the art will understand that the gating function need only be applied to either the actual waveform or the ideal waveform. Moreover, the specific implementation of the gating function may take on various forms. In the described exemplary embodiment, the algorithm implemented by the processor multiplies the ideal and actual waveform by a non-zero value for samples drawn from the TDMA channel of interest and zero elsewhere. With this approach, the actual and ideal waveforms for any particular TDMA channel contribute to the summation only when k is sequenced through samples within the TDMA channel of interest. When k is sequenced through samples outside the TDMA channel of interest, the actual and ideal waveforms provide no contribution to the summation process because $g[k]$ for the TDMA channel of interest is set to zero. Alternatively, the limits of the summations can be set to ensure that only samples from the TDMA channel of interest are used. By way of example, if the first one-hundred samples are drawn from the first TDMA channel $TDMA_1$, and the second one-hundred samples are drawn from the second TDMA channel $TDMA_2$, then equation (5) can be rewritten as follows:

$$\xi_i^{Ch1} = \frac{\left|\sum_{1}^{100} z_k^{Ch2} \cdot r_{i,k}^{Ch2}\right|^2}{\sum_{1}^{100} |r_{i,k}^{Ch1}|^2} \text{ and } \xi_i^{Ch2} = \frac{\left|\sum_{101}^{200} z_k^{Ch2} \cdot r_{i,k}^{Ch2*}\right|^2}{\sum_{101}^{200} |r_{i,k}^{Ch2*}|^2} \quad (9)$$

Once the unnormalized cross-correlated values between the ideal waveform referred to in FIG. 1 and the corresponding actual waveform have been computed by the processor, the power level difference ($\Delta$) between the TDMA channels can be expressed as:

$$\Delta = 10 \cdot \log_{10}\left(\frac{\xi^{ch1}}{\xi^{ch2}}\right) \text{dB} \quad (10)$$

The described exemplary power measurement device can be used for various communication devices. By way of example, the power measurement device could be used to measure the relative power of TDMA channels in a high data rate (HDR) transmitter. The HDR communications system is typically designed to conform to one or more standards, such as the "cdma2000 High Rate Packet Data Interface Specification," 3GPP2 C.S0024, Version 2, Oct. 27, 2000, promulgated by a consortium called "3$^{rd}$ Generation Partnership Project." The contents of the aforementioned standard is incorporated by reference herein. The HDR communication system defines a set of data rates, ranging from 38.4 kbps to 2.4 Mbps, over a forward-link, and 9.6 kbps to 153.6 kbps over of a reverse-link. The forward-link refers to transmissions from a base station to a subscriber station and the reverse-link refers to transmissions from the subscriber station to the base station. An origination terminal may send data packets to a receiving terminal. The HDR system utilizes a waveform with channels distinguished both in the time domain and code domain.

Figure 4:
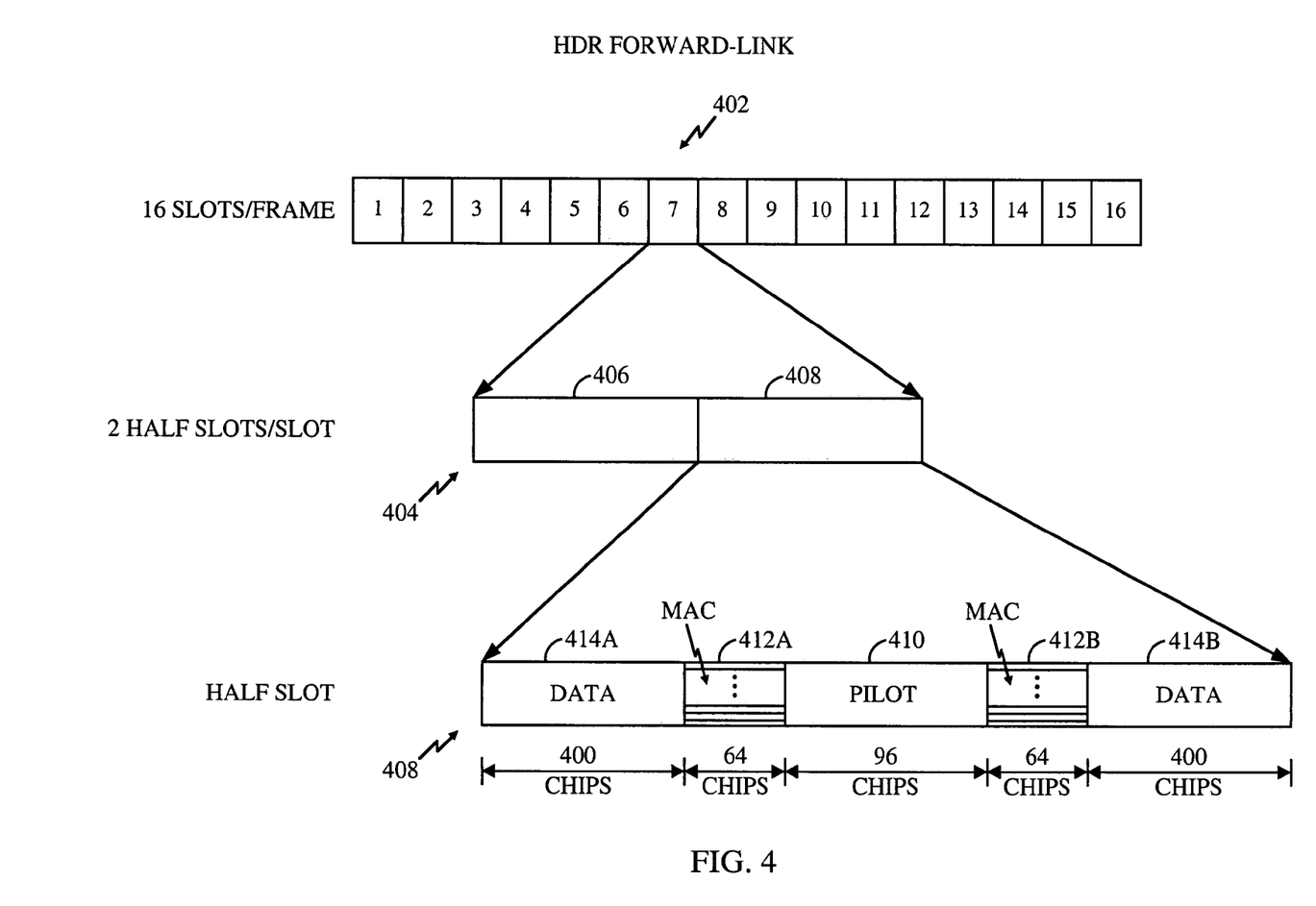
FIG. 4 is a timing diagram of an exemplary ideal waveform for a forward-link High Data Rate communication system.

FIG. 4 illustrates an exemplary waveform used in HDR communications systems modeled after a forward-link waveform. The waveform is partitioned into frames 402 with each frame having 16 time slots. Each time slot 404 is 2048 chips long, corresponding to a 1.67 millisecond slot duration and a 26.67 ms frame duration. Each time slot is divided into two half-slots 406, 408, with a pilot burst 410 within each half-slot 408. In the described exemplary embodiment, each pilot burst 410 is 96 chips long, and is centered at the mid-point of its respective half-slot 408. A Walsh code with index 0 is used to modulate the pilot signal carried in the pilot burst time slots 410. The pilot channel is used for synchronization purposes and for coherent demodulation. A forward medium access control channel (MAC) forms two bursts 412a, 412b in each half-slot 408. The MAC bursts 412a, 412b are each 64 chips long and are transmitted immediately before and immediately after the pilot burst 410 of each half-slot. In the described exemplary embodiment, the MAC is composed of up to 64 code channels, which are orthogonally covered by 64-ary Walsh codes. Each code channel is identified by a MAC index, which has a value between 0 and 63, and identifies the unique 64-ary Walsh code. The forward-link traffic channel and control channel payload is sent in the remaining portions 414a, 414b of the half slot 408. The forward-link traffic channel and control channel data are encoded, scrambled, and interleaved. The interleaved data is modulated, repeated, and punctured, as necessary. Then, the resulting sequences of modulation symbols are demultiplexed to form 16 pairs (in-phase and quadrature) of parallel streams. Each of the parallel streams is covered with a distinct 16-ary Walsh code, yielding a code-distinguished channel.

A power measurement device can be configured to measure the relative power of the forward-link pilot and MAC channels for an HDR transmitter. This can be accomplished by computing the unnormalized cross-correlated value ($\xi$) between the ideal waveform for the pilot and the MAC channels referred to in FIG. 4 and the corresponding actual waveforms. Referring back to FIG. 4, one can see that the pilot and MAC bursts occupy all CDMA channels within their respective time slot. Hence, the relative power levels between the pilot and MAC bursts for any CDMA channel can be computed using the code domain power coefficient methodology described earlier. Alternatively, the total power of the pilot burst with respect to the MAC bursts can be computed over all CDMA channels using a single parameter known as modulation accuracy ($\rho$). The modulation accuracy ($\rho$) is defined as the normalized ratio of power of the actual waveform generated by the CDMA transmitter that correlates with the ideal waveform for all CDMA channels. Using the modulation accuracy ($\rho$) for each of the pilot and MAC channels, equation (2) can be rewritten as follows:

$$\xi^{pilot} = \rho^{pilot} \cdot \sum_{k=1}^{M^{pilot}} |z_k^{pilot}|^2 \text{ and } \xi^{MAC} = \rho^{MAC} \cdot \sum_{k=1}^{M^{MAC}} |z_k^{MAC}|^2 \quad (11)$$

where ($\rho^{pilot}$) can be expressed as:

$$\rho^{pilot} = \frac{\left|\sum_{k=1}^{M^{pilot}} z_k^{pilot} \cdot r_k^{pilot*}\right|^2}{\left\{\sum_{k=1}^{M^{pilot}} |z_k^{pilot}|^2\right\} \cdot \left\{\sum_{k=1}^{M^{pilot}} |r_k^{pilot}|^2\right\}} ; \text{and} \quad (12)$$

where ($\rho^{MAC}$) can be expressed as:

$$\rho^{MAC} = \frac{\left|\sum_{k=1}^{M^{MAC}} z_k^{MAC} \cdot r_k^{MAC*}\right|^2}{\left\{\sum_{k=1}^{M^{MAC}} |z_k^{MAC}|^2\right\} \cdot \left\{\sum_{k=1}^{M^{MAC}} |r_k^{MAC}|^2\right\}} \quad (13)$$

From equations (12) and (13), equation (11) can be rewritten as:

$$\xi^{pilot} = \frac{\left|\sum_{k=1}^{M^{pilot}} z_k^{pilot} \cdot r_k^{pilot*}\right|^2}{\sum_{K=1}^{M_{pilot}} |r_k^{pilot}|^2} \text{ and } \xi^{MAC} = \frac{\left|\sum_{k=1}^{M^{MAC}} z_k^{MAC} \cdot r_k^{MAC*}\right|^2}{\sum_{K=1}^{M_{MAC}} |r_k^{MAC}|^2} \quad (14)$$

The dot-product in the numerator of equation (14) between the actual waveform and the ideal waveform for all CDMA channels effectively despreads the spectrum of the signal in every CDMA channel.

The processor algorithm can compute the unnormalized cross-correlated value for the pilot and MAC channels between the actual and ideal waveforms directly from equation (14). By way of example, from the forward-link HDR waveforms, the pilot MAC channel portions are first defined using the gating function g[k] where:

z[k] represents samples of the actual waveform of the forward-link HDR waveform;

r[k] represents samples of the ideal waveform of the forward-link HDR waveform; and $$z_k^{pilot} = z[k] \cdot g^{pilot}[k] \; r_k^{pilot} = r[k] \cdot g^{pilot}[k] \quad (15)$$

$$z_k^{MAC} = z[k] \cdot g^{MAC}[k] \; r_k^{MAC} = r[k] \cdot g^{MAC}[k]$$

where:

$$g^{pilot}[k] = \begin{cases} 1 & \text{if } 465 \leq (k \bmod 1024) \leq 560 \\ 0 & \text{elsewhere} \end{cases} \quad (16)$$

-continued $$g^{MAC}[k] = \begin{cases} 1 \text{ if } \begin{cases} 401 \leq (k \bmod 1024) \leq 464 \\ 561 \leq (k \bmod 1024) \leq 624 \end{cases} \\ 0 \text{ elsewhere} \end{cases}$$

where [(k mod 1024)=1] occurs at the first chip of every half slot.

After the pilot and MAC channel portions of the waveform are defined, the computation set forth in equation (14) can be performed. In at least one exemplary embodiment, the summation is performed over the same number of samples for both the pilot and MAC channels. This approach tends to equalize the noise variance contribution of each channel. By way of example, the unnormalized cross-correlation values between the actual waveform and the ideal waveform for the pilot and MAC channels can be computed using 1024 samples from each channel. Since the pilot burst is 96 chips for each half-slot, k must be sequenced through eleven half-slots to obtain 1024 samples. More particularly, the processor can extract 960 samples through the first ten half-slots and the additional 64 samples in the eleventh half slot. To this end, k can be sequenced through 10,240 chips to cover the first ten half-slots. To obtain the additional 64 samples, k can be further sequenced through 464 chips in the eleventh half-slot to reach the pilot burst and then an additional 64 chips to obtain the remaining samples for the pilot channel. Thus, k should be sequenced through 10,768 chips to obtain 1024 pilot channel samples.

The MAC bursts, on the other hand, are 128 chips for each half-slot. The processor can extract 1024 MAC channel samples by sequencing k through eight half-slots. Thus, k should be sequenced through 8,192 chips to obtain 1024 samples of the MAC channel.

Hence:

$$\xi^{pilot} = \frac{\left| \sum_{k=1}^{10768} z_k^{pilot} \cdot r_k^{pilot*} \right|^2}{\sum_{k=1}^{10768} |r_k^{pilot}|^2} \text{ and } \xi^{MAC} = \frac{\left| \sum_{k=1}^{8192} z_k^{MAC} \cdot r_k^{MAC*} \right|^2}{\sum_{k=1}^{8192} |r_K^{MAC}|^2} \quad (17)$$

From equation (17), the processor can compute the power level of the pilot channel with respect to the power level of the MAC channel as follows:

$$\Delta_{pilot/MAC} = 10 \cdot \log_{10}\left(\frac{\xi^{pilot}}{\xi^{MAC}}\right) dB \quad (18)$$

Figure 5:
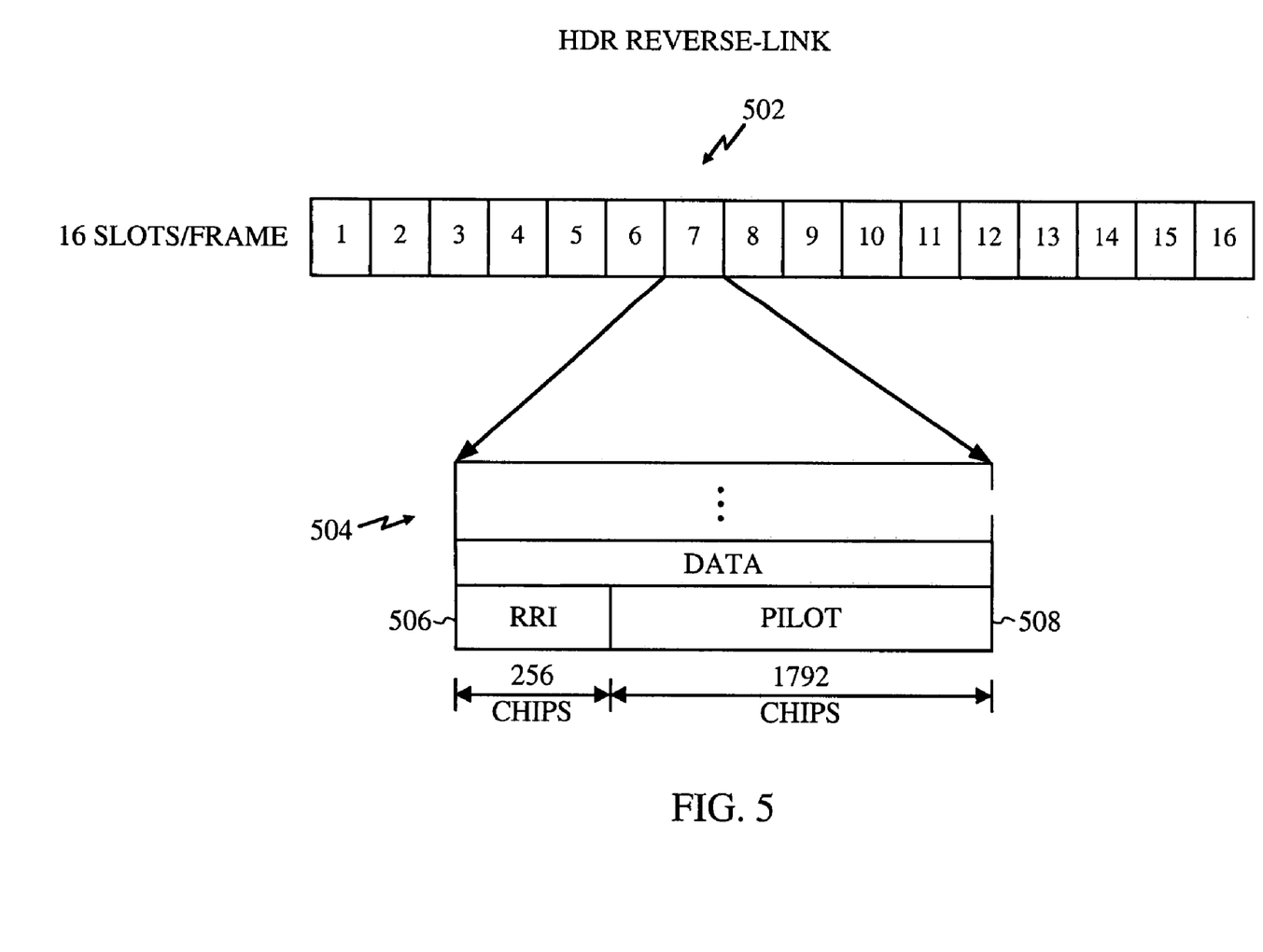
FIG. 5 is a timing diagram of an exemplary ideal waveform for a reverse-link High Data Rate communication system.

FIG. 5 illustrates an exemplary waveform used in HDR communications systems modeled after a reverse-link waveform. The waveform is partitioned into frames 502 with each frame having 16 time slots. Each time slot 504 is 2048 chips long, corresponding to a 1.67 millisecond slot duration and a 26.67 ms frame duration. In the described exemplary embodiment, each time slot 504 includes an RRI burst 506 which is 256 chips long followed by a pilot burst 508 which is 1792 chips long. A Walsh code with index 0 is used to modulate the RRI and pilot signal carrier.

The relative power levels between the RRI and pilot channel can also be computed by the processor for the reverse-link HDR waveform. In the reverse-link HDR waveform, the RRI and pilot channels occupy a single CDMA channel. Therefore, the processor should compute the relative power using the code domain power coefficients for that CDMA channel. By way of example, from the reverse-link HDR waveforms, the RRI channel and pilot channel portions are first defined using the gating function g[k] where:

$$z_k^{pilot} = z[k] \cdot g^{pilot}[k] \, r_{0,k}^{pilot} = r_0[k] \cdot g^{pilot}[k] \quad (19)$$

$$z_k^{RRI} = z[k] \cdot g^{RRI}[k] \, r_{0,k}^{RRI} = r_0[k] \cdot g^{RRI}[k]$$

where:

z[k] represents samples of the actual waveform for the reverse-link HDR waveform; and $r_0[k]$ corresponds to the $0^{th}$ code channel of the ideal waveform for the reverse-link HDR waveform r[k]; and $$g^{pilot}[k] = \begin{cases} 1 \text{ if } \begin{cases} 257 \leq (k \bmod 2048) \leq 2047 \\ (k \bmod 2048) = 0 \end{cases} \\ 0 \text{ elsewhere} \end{cases} \quad (20)$$

and $$g^{RRI}[k] = \begin{cases} 1 \text{ if } 1 \leq (k \bmod 2048) \leq 256 \\ 0 \text{ elsewhere} \end{cases}$$

and [(k mod 2048)]=1 occurs at the first chip of every slot.

Similar to the forward-link HDR waveform, the computation set forth in equation (5) can be computed after the pilot and RRI portions of the waveform are defined. In at least one exemplary embodiment, the summation is performed over the same number of samples for both the RRI and pilot channels to equalize the noise variance contribution of each channel. Byway of example, the unnormalized cross-correlation values between the actual waveform and the ideal waveform for the pilot and RRI channels can be computed using a multiple of the Walsh symbol period such as 1024 samples from each channel. Since the RRI burst is 256 chips for each slot, k should be sequenced through four slots, or 8192 chips, to obtain 1024 samples.

The pilot burst, on the other hand, is 1,792 chips for each slot. Consequently, k can be sequenced through only a portion of one slot to obtain 1024 samples. k can be first sampled over 256 chips to reach the pilot burst. Once the pilot burst is reached, the processor can extract the next 1024 samples. Thus, to obtain 1024 samples of the pilot channel, k should be sequenced through 1,280 chips.

Hence:

$$\xi^{pilot} = \frac{\left| \sum_{k=1}^{1280} z_k^{pilot} \cdot r_{0,k}^{pilot*} \right|^2}{\sum_{k=1}^{1280} |r_{0,k}^{pilot}|^2} \text{ and } \xi^{RRI} = \frac{\left| \sum_{k=1}^{8192} z_k^{RRI} \cdot r_{0,k}^{RRI*} \right|^2}{\sum_{k=1}^{8192} |r_{0,k}^{RRI}|^2} \quad (21)$$

From equation (21), the processor can compute the power level of the pilot channel with respect to the power level of the RRI channel as follows:

$$\Delta_{pilot/RRI} = 10 \cdot \log_{10}\left(\frac{\xi^{pilot}}{\xi^{RRI}}\right) \quad (22)$$

Theoretically, increased accuracy in the relative power measurement can be achieved by increasing the number of samples used in the summation process to compute the unnormalized cross-correlated values between the actual and ideal waveforms. However, in practice, this theoretical increase in accuracy is generally offset by drift in the transmitting device causing time, frequency and phase offsets in the actual waveform relative to the ideal waveform. In channel structures exhibiting a high degree of periodicity, equation (5) can be modified to allow a large number of samples to be summed without the adverse effect of transmitter drift. This can be accomplished by computing the unnormalized cross-correlated values between the actual and ideal waveforms over several periods and adjusting the frequency, timing and phase offsets at the beginning of the summation process for each period. Alternatively, the unnormalized cross-correlated values between the actual and ideal waveforms can be computed over several periods without adjusting the frequency, timing and phase offsets. As those skilled in the art will appreciate, the frequency, timing, and phase offsets can be adjusted any number of times during the summation process for one or more periods, or can be adjusted at the beginning or during the summation process once for any number of periods. The resulting summation for each period can then be summed together to obtain the final unnormalized cross-correlated values between the actual and ideal waveforms. By way of example, equation (5) can be rewritten as follows:

$$\xi_i^{Ch1} = \sum_{j=1}^{N_1}\left\{\frac{\left|\sum_{k=1}^{M_1} z_{j,k}^{Ch1} \cdot r_{i,j,k}^{Ch1*}\right|^2}{\sum_{k=1}^{M_1} |r_{i,j,k}^{Ch1}|^2}\right\} \quad (23)$$

and $$\xi_i^{Ch2} = \sum_{j=1}^{N_2}\left\{\frac{\left|\sum_{k=1}^{M_2} z_{j,k}^{Ch2} \cdot r_{i,j,k}^{Ch2*}\right|^2}{\sum_{k=1}^{M_1} |r_{i,j,k}^{Ch2}|^2}\right\}$$

where:

j is an index designating, by way of example, an elementary unit of a waveform;

i is an index designating the CDMA channel of interest;

N is a summation limit designating the number of elementary units;

k is an index designating a sample in the elementary unit;

M is a summation limit designating the number of samples in the elementary unit and is a multiple of the Walsh symbol period;

$z_{j,k}=z[M(j-1)+k]$ is a $k_{th}$ sample in the $j_{th}$ elementary unit of the actual waveform; and $r_{i,j,k}=r[M(j-1)+k]$ is a $k_{th}$ sample in the $j_{th}$ elementary unit of the ideal waveform for the CDMA channel of interest.

An elementary unit is defined as a minimum waveform span defining a complete channel structure. By way of example, in the described exemplary HDR forward-link waveform, the elementary unit is a half-slot, and consequently, the summation limit M=1024.

Those skilled in the art will recognize that if the number of samples M in an elementary unit is small, any number of elementary units may be computed by the inner summation. Conversely, if the number of samples M in an elementary unit is large, portions of the elementary unit can be computed separately by the inner summation. Moreover, the number of elementary units N computed by the outer summation can vary to equalize the noise variance, and more particularly, the number of elementary units computed for one channel can be different from the number of elementary units computed for another channel.

In the exemplary HDR system, the unnormalized cross-correlated value for the forward-link set forth in equation (23) can be written as follows:

$$\xi^{pilot} = \sum_{j=1}^{10}\left\{\frac{\left|\sum_{k=1}^{1024} z_{j,k}^{pilot} \cdot r_{j,k}^{pilot*}\right|^2}{\sum_{k=1}^{1024} |r_{j,k}^{pilot}|^2}\right\} + \left\{\frac{\left|\sum_{k=1}^{528} z_{11,k}^{pilot} \cdot r_{11,k}^{pilot*}\right|^2}{\sum_{k=1}^{528} |r_{11,k}^{pilot}|^2}\right\} \quad (24)$$

and $$\xi^{MAC} = \sum_{j=1}^{8}\left\{\frac{\left|\sum_{k=1}^{1024} z_{j,k}^{MAC} \cdot r_{j,k}^{MAC*}\right|^2}{\sum_{k=1}^{1024} |r_{j,k}^{MAC}|^2}\right\}$$

In equation (25) the unnormalized cross-correlated value between the actual and ideal waveform for the pilot channel is computed over ten half-slots plus a portion of the eleventh half-slot and the unnormalized cross-correlated value between the actual and ideal waveform for the MAC channel is computed over 8 half-slots. Each half-slot is 1024 chips. Increased accuracy maybe achieved by adjusting the frequency, timing and phase offsets each time the inner summation is completed.

Similarly, the unnormalized cross-correlated values between the actual and ideal waveforms for the exemplary reverse-link HDR waveform set forth in Equation (23) can be rewritten as follows:

$$\xi_{pilot} = \frac{\left|\sum_{k=1}^{1280} z_{j,k}^{pilot} \cdot r_{0,j,k}^{pilot*}\right|}{\sum_{k=1}^{1280} |r_{0,j,k}^{pilot}|^2} \text{ and} \quad (25)$$

$$\xi_{RRI} = \sum_{j=1}^{4}\left\{\frac{\left|\sum_{k=1}^{2048} z_{j,k}^{RRI} \cdot r_{0,j,k}^{RRI*}\right|^2}{\sum_{k=1}^{2048} |r_{0,j,k}^{RRI}|^2}\right\}$$

In equation (25) the unnormalized cross-correlated value between the actual and ideal waveform for the pilot channel is computed over a portion of one slot and the unnormalized cross-correlated value between the actual and ideal waveform for the RRI channel is computed over 4 slots. Each slot is 2048 chips. Increased accuracy may be achieved by adjusting the frequency, time and phase offsets each time the inner summation is completed.

In at least one exemplary embodiment, the unnormalized cross-correlated values between the actual and ideal waveforms can be computed directly with a processor that implements the algorithm set forth in Equation (23). Alternatively, the unnormalized cross-correlated values between the actual and ideal waveforms can be computed from the code domain power coefficients ($\rho_i$). This approach may be attractive in power measurement devices that also perform waveform quality measurements requiring the computation of code domain power coefficients. In these systems, one skilled in the art may program the processor to first compute the code domain power coefficients ($\rho_i$) for each TDMA channel and then compute the unnormalized cross-correlation values between the actual and ideal waveforms using equation (2).

The computation of the code domain power coefficient ($\rho_i$) may take on various forms depending on the specific application and overall design constraints. In systems utilizing an inner and outer summation process to cover a large number of samples without the adverse effects of transmitter drift, the code domain power coefficient ($\rho_i$) can be expressed as:

$$\rho_i = \frac{1}{N}\sum_{j=1}^{N}\left\{\frac{\left|\sum_{k=1}^{M}z_{j,k}\cdot r^*_{i,j,k}\right|^2}{\sum_{k=1}^{M}|z_{j,k}|^2 \cdot \sum_{k=1}^{M}|r_{i,j,k}|^2}\right\} \quad (26)$$

Alternatively, the code domain power coefficient ($\rho_i$) can be expressed as $$\rho_i = \frac{\sum_{j=1}^{N}\left|\sum_{k=1}^{M}z_{j,k}\cdot r^*_{j,k,i}\right|^2}{\sum_{j=1}^{N}\left\{\sum_{k=1}^{M}|z_{j,k}|^2 \cdot \sum_{k=1}^{M}|r_{i,j,k}|^2\right\}} \quad (27)$$

Alternatively, the code domain power coefficient ($\rho_i$) can be expressed as:

$$\rho_i = \frac{\sum_{j=1}^{N}\left\{\frac{\left|\sum_{k=1}^{M}z_{j,k}\cdot r^*_{i,j,k}\right|^2}{\sum_{K=1}^{M}|r_{i,j,k}|^2}\right\}}{\sum_{j=1}^{N}\sum_{k=1}^{M}|z_{j,k}|^2} \quad (28)$$

In power measurement devices that also perform waveform quality measurements, a processor utilizing an algorithm implementing equation (28) may reduce computational complexity. Computational complexity reduction maybe achieved because a single equation can be used to compute both the code domain coefficients ($\rho_i$) and the unnormalized cross-correlated values ($\xi$) between the actual and ideal waveforms. Turning to equation (28), one skilled in the art will readily appreciate that the numerator of the code domain power coefficient ($\rho_i$) computation is the unnormalized cross-correlated value.

In communications systems where the power measurement is to be performed on a transmission that occupies all code channels for its respective time slot, equations (26), (27) and (28) can be rewritten to represent the modulation accuracy ($\rho$).

Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, microcontroller, or state machine. The software module could reside in RAM memory, flash memory, ROM memory, registers, hard disk, a removable disk, a CD-ROM, or any other form of storage medium known in the art. Those of skill would further appreciate that the data, instructions, commands, signals, bits, symbols, and chips that maybe referenced throughout the above description are advantageously represented by voltages, currents, electromagnetic waves, magnetic fields or particles, optical fields or particles, or any combination thereof.

The previous description of the preferred embodiments, using communication systems to exemplify measurement of waveform quality, is provided to enable any person skilled in the art to make or use the present invention. The various modifications to these embodiments will be readily apparent to those skilled in the art, and the generic principles defined herein maybe applied to other embodiments without the use of the inventive faculty. Specifically, one of ordinary skills in the art will understand that the generic principles disclosed apply equally to any like waveform regardless of the equipment that generated the waveform. Thus, the present invention is not intended to be limited to the embodiments shown herein but is to be accorded the widest scope consistent with the principles and novel features disclosed herein.

What is claimed is:

1. A method of monitoring a signal having a first plurality of channels separated in a first format, and a second plurality of channels separated in a second format different from the first format, comprising:
measuring a first parameter of a first one of the first channels, wherein measuring the first parameter comprises computing an unnormalized cross-correlated value between an actual waveform of the first one of the first channels and an ideal waveform for at least one of the second channels that correlates with the actual waveform;
measuring a second parameter of a second one of the first channels; and
computing relative power between the first one of the first channels and the second one of the first channels as a function of the first and second parameters to ensure regulatory minimum performance.

2. The method of claim 1 wherein the second format comprises a code division multi-access format.

3. The method of claim 2 wherein the first format comprises a time division multi-access format.

4. The method of claim 1 wherein the computation of the unnormalized cross-correlated value comprises solving the following equation:

$$\xi = \frac{\left|\sum_{k=1}^{M} z_k \cdot r_k^*\right|^2}{\sum_{k=1}^{M} |r_k|^2}$$

where:
$\xi$ represents the unnormalized cross-correlated value between the actual waveform of the first one of the first channels and the ideal waveform that correlates to the actual waveform;
$z_k$ represents actual waveform samples from the first one of the first channels;
$r_k$ represents ideal waveform samples for at least one of the second channels that correlate with the actual waveform samples;
M represents a number of samples in the first one of the first channels used to compute; and
[ ]* represents a complex conjugate.

5. The method of claim 1 wherein the computation of the unnormalized cross-correlated value comprises solving the following equation:

$$\xi = \sum_{J=1}^{N} \left\{ \frac{\left|\sum_{k=1}^{M} z_{j,k} \cdot r_{j,k}^*\right|^2}{\sum_{k=1}^{M} |r_{j,k}|^2} \right\}$$

where:
$\xi$ represents the unnormalized cross-correlated value between the actual waveform of the first one of the first channels and the ideal waveform that correlates to the actual waveform;
j represents an index designating an elementary unit of the actual waveform;
k is an index designating a sample in the elementary unit;
$z_{j,k}$ represents actual waveform samples in the $j^{th}$ elementary unit from the first one of the first channels;
$r_{j,k}$ represents ideal waveform samples in the $j^{th}$ elementary unit for at least one of the second channels that correlate with the actual waveform samples;
M represents a number of samples in the first one of the first channels used to compute;
N is a summation limit designating the number of elementary units; and
[ ]* represents a complex conjugate.

6. The method of claim 1 wherein the relative power computation comprises computing a ratio of the first and second parameters.

7. The method of claim 6 wherein the relative power computation comprises a logarithmic ratio.

8. The method of claim 6 wherein the measurement of the first parameter comprises computing an unnormalized cross-correlated value ($\xi^{ch1}$) between an actual waveform of the first one of the first channels and an ideal waveform for at least one of the second channels that correlates to the actual waveform of the first one of the first channels, and computing an unnormalized cross-correlated value (($\xi^{ch2}$) between an actual waveform of the second one of the first channels and an ideal waveform for said at least one of the second channels that correlates to the actual waveform of the second one of the first channels.

9. The method of claim 8 wherein the relative power computation ($\Delta$) further comprising solving the following equation:

$$\Delta = 10 \cdot \log_{10}\left(\frac{\xi^{ch1}}{\xi^{ch2}}\right).$$

10. A power measurement device, comprising a processor configured to receive first and second waveforms, measure a first parameter as a function of the first and second waveforms over a first time period, the first parameter comprising a first unnormalized cross-correlated value between the first waveform and the second waveform that correlates with the first time period, measure a second parameter as a function of the first and second waveforms over a second time period, the second parameter comprising a second unnormalized cross-correlated value between the first waveform and the second waveform that correlates with the first waveform over the second time period, and compute relative power of the first waveform between the first and second time periods to ensure regulatory minimum performance.

11. The power measurement device of claim 10 further comprising a receiver configured to receive the first waveform from a communications medium and to couple samples of the first waveform to the processor.

12. The power measurement device of claim 11 wherein the receiver comprises a compensator configured to compensate the first waveform in accordance with the second waveform.

13. The power measurement device of claim 12 wherein the compensator is configured to compensate the first waveform for time, frequency and phase offsets with respect to the second waveform.

14. The power measurement device of claim 11 wherein the receiver comprises a downconverter configured to downconvert the first waveform to baseband, and a sampler configured to sample the baseband first waveform.

15. The power measurement device of claim 10 further comprising a signal generator configured to generate the second waveform.

16. The power measurement device of claim 15 wherein the signal generator is configured to couple samples of the second waveform to the processor.

17. The power measurement device of claim 16 wherein the signal generator comprises a signal source configured to generate the second waveform, and a sampler configured to sample the second waveform.

18. The power measurement device of claim 10 further comprising a receiver configured to receive the first waveform from a communications medium and to couple samples of the first waveform to the processor, and a signal generator configured to generate and couple samples of the second waveform to the processor.

19. The power measurement device of claim 18 wherein the receiver comprises a compensator configured to compensate the first waveform in accordance with the second waveform.

20. The power measurement device of claim 19 wherein the compensator is configured to compensate the first waveform for time, frequency and phase offsets with respect to the second waveform.

21. The power measurement device of claim 10 wherein the processor is further configured to compute the relative power by computing a ratio of the first and second parameters.

22. The power measurement device of claim 21 wherein the relative power computation comprises a logarithmic ratio.

23. A power measurement device, comprising a processor configured to receive a signal having a first plurality of channels separated in a first format, and a second plurality of channels separated in a second format different from the first format, the processor further configured to measure a first parameter of a first one of the first channels by computing an unnormalized cross-correlated value between an actual waveform of the first one of the first channels and an ideal waveform for at least one of the second channels that correlates with the actual waveform, measure a second parameter of a second one of the first channels, and compute relative power between the first one of the first channels and the second one of the first channels as a function of the first and second parameters to ensure regulatory minimum performance.

24. The power measurement device of claim 23 wherein the second format comprises a code division multi-access format.

25. The power measurement device of claim 24 wherein the first format comprises a time division multi-access format.

26. The power measurement device of claim 23 wherein the processor is further configured to compute the unnormalized cross-correlated value by solving the following equation:

$$\xi = \frac{\left| \sum_{k=1}^{M} z_k \cdot r_k^* \right|^2}{\sum_{k=1}^{M} |r_k|^2}$$

where:
  $\xi$ represents the unnormalized cross-correlated value between the actual waveform of the first one of the first channels and the ideal waveform that correlates to the actual waveform;
  $z_k$ represents actual waveform samples from the first one of the first channels;
  $r_k$ represents ideal waveform samples for at least one of the second channels that correlate with the actual waveform samples;
  M represents a number of samples in the first one of the first channels used to compute; and
  [ ]* represents the complex conjugate.

27. The power measurement device of claim 23 wherein the processor is further configured to compute the unnormalized cross-correlated value by solving the following equation:

$$\xi = \sum_{j=1}^{N} \left\{ \frac{\left| \sum_{k=1}^{M} z_{j,k} \cdot r_{j,k}^* \right|^2}{\sum_{k=1}^{M} |r_{j,k}|^2} \right\}$$

where:
  $\xi$ represents the unnormalized cross-correlated value between the actual waveform of the first one of the first channels and the ideal waveform that correlates to the actual waveform;
  j represents an index designating an elementary unit of the actual waveform;
  k is an index designating a sample in the elementary unit;
  $z_{j,k}$ represents actual waveform samples in the $j^{th}$ elementary unit from the first one of the first channels;
  $r_{j,k}$ represents ideal waveform samples in the $j^{th}$ elementary unit for at least one of the second channels that correlate with the actual waveform samples;
  M represents a number of samples in the first one of the first channels used to compute;
  N is a summation limit designating the number of elementary units; and
  [ ]* represents a complex conjugate.

28. The power measurement device of claim 23 wherein the processor is further configured to compute the relative power by computing a ratio of the first and second parameters.

29. The power measurement device of claim 28 wherein the relative power computation comprises a logarithmic ratio.

30. The power measurement device of claim 28 wherein the processor is further configured to measure the first parameter by computing an unnormalized cross-correlated value ($\xi^{ch1}$) between an actual waveform of the first one of the first channels and an ideal waveform for at least one of the second channels that correlates to the actual waveform of the first one of the first channels, and computing an unnormalized cross-correlated value (($\xi^{ch2}$) between an actual waveform of the second one of the first channels and an ideal waveform for said at least one of the second channels that correlates to the actual waveform of the second one of the first channels.

31. The power measurement device of claim 30 wherein the processor is further configured to compute the relative power ($\Delta$) by solving the following equation:

$$\Delta = 10 \cdot \log_{10}\left(\frac{\xi^{ch1}}{\xi^{ch2}}\right).$$

32. A method of measuring power, comprising:
measuring a first parameter as a function of first and second waveforms over a first time period, wherein the first parameter measurement comprises computing a first unnormalized cross-correlated value between the first waveform and the second waveform that correlates with the first time period;
measuring a second parameter as a function of the first and second waveforms over a second time period, wherein the second parameter measurement comprises computing a second unnormalized cross-correlated value between the first waveform and the second waveform that correlates with the first waveform over the second time period; and
computing relative power of the first waveform between the first and second time periods to ensure regulatory minimum performance.

33. The method of claim 32 wherein the first and second parameter measurements each further comprises computing its respective first or second unnormalized cross-correlated value using samples of the first and second waveforms.

34. The method of claim 33 further comprising compensating the first waveform in accordance with the second waveform.

35. The method of claim 34 wherein the waveform compensation comprises compensating the first waveform for time, frequency and phase offsets with respect to the second waveform.

36. The method of claim 32 wherein the relative power computation comprises computing a ratio of the first and second parameters.

37. The method of claim 36 wherein the relative power computation comprises computing a logarithmic ratio.

38. Computer-readable media embodying a program of instructions executable by a computer to perform a method of monitoring a signal having a first plurality of channels separated in a first format, and a second plurality of channels separated in a second format different from the first format, the method comprising:
measuring a first parameter of a first one of the first channels, wherein the measurement of the first parameter comprises computing an unnormalized cross-correlated value between an actual waveform of the first one of the first channels and an ideal waveform for at least one of the second channels that correlates with the actual waveform;
measuring a second parameter of a second one of the first channels; and
computing relative power between the first one of the first channels and the second one of the first channels as a function of the first and second parameters to ensure regulatory minimum performance.

39. The computer-readable media of claim 38 wherein the second format comprises a code division multi-access format.

40. The computer-readable media of claim 39 wherein the first format comprises a time division multi-access format.

41. The computer-readable media of claim 38 wherein the computation of the unnormalized cross-correlated value comprises solving the following equation:

$$\xi = \frac{\left|\sum_{k=1}^{M} z_k \cdot r_k^*\right|^2}{\sum_{k=1}^{M} |r_k|^2}$$

where:
$\xi$ represents the unnormalized cross-correlated value between the actual waveform of the first one of the first channels and the ideal waveform that correlates to the actual waveform;
$z_k$ represents actual waveform samples from the first one of the first channels;
$r_k$ represents ideal waveform samples for at least one of the second channels that correlate with the actual waveform samples;
M represents a number of samples in the first one of the first channels used to compute; and
[ ]* represents a complex conjugate.

42. The computer-readable media of claim 38 wherein the computation of the unnormalized cross-correlated value comprises solving the following equation:

$$\xi = \sum_{J=1}^{N}\left\{\frac{\left|\sum_{k=1}^{M} z_{j,k} \cdot r_{j,k}^*\right|^2}{\sum_{k=1}^{M} |r_{j,k}|^2}\right\}$$

where:
$\xi$ represents the unnormalized cross-correlated value between the actual waveform of the first one of the first channels and the ideal waveform that correlates to the actual waveform;
j represents an index designating an elementary unit of the actual waveform;
k is an index designating a sample in the elementary unit;
$z_{j,k}$ represents actual waveform samples in the $j^{th}$ elementary unit from the first one of the first channels;
$r_{j,k}$ represents ideal waveform samples in the $j^{th}$ elementary unit for at least one of the second channels that correlate with the actual waveform samples;
M represents a number of samples in the first one of the first channels used to compute;
N is a summation limit designating the number of elementary units; and
[ ]* represents a complex conjugate.

43. The computer-readable media of claim 38 wherein the relative power computation comprises computing a ratio of the first and second parameters.

44. The computer-readable media of claim 43 wherein the relative power computation comprises a logarithmic ratio.

45. The computer-readable media of claim 43 wherein the measurement of the first parameter comprises computing an unnormalized cross-correlated value ($\xi^{ch1}$) between an actual waveform of the first one of the first channels and an ideal waveform for at least one of the second channels that correlates to the actual waveform of the first one of the first channels, and computing an unnormalized cross-correlated value (($\xi^{ch2}$) between an actual waveform of the second one of the first channels and an ideal waveform for said at least one of the second channels that correlates to the actual waveform of the second one of the first channels.

46. The computer-readable media of claim 45 wherein the relative power computation (Δ) further comprising solving the following equation:

$$\Delta = 10 \cdot \log_{10}\left(\frac{\xi^{ch1}}{\xi^{ch2}}\right).$$

47. A power measurement device, comprising:
first measurement means for measuring a first parameter as a function of first and second waveforms over a first time period, the first parameter comprising a first unnormalized cross-correlated value between the first waveform and the second waveform that correlates with the first time period;
second measurement means for measuring a second parameter as a function of the first and second waveforms over a second time period, the second parameter comprises a second unnormalized cross-correlated value between the first waveform and the second waveform that correlates with the first waveform over the second time period; and
computation means for computing relative power of the first waveform between the first and second time periods to ensure regulatory minimum performance.

48. The power measurement device of claim 47 further comprising receiving means for receiving the first waveform from a communications medium, and means for coupling samples of the first waveform to the first and second measurement means.

49. The power measurement device of claim 48 wherein the receiving means comprises compensating means for compensating the first waveform in accordance with the second waveform.

50. The power measurement device of claim 49 wherein compensating means is configured to compensate the first waveform for time, frequency and phase offsets with respect to the second waveform.

51. The power measurement device of claim 48 wherein the receiving means comprises means for down converting the first waveform to baseband, and means for sampling the baseband first waveform.

52. The power measurement device of claim 47 further comprising signal generation means for generating the second waveform.

53. The power measurement device of claim 52 wherein the signal generation means is configured to couple samples of the second waveform to the first and second measurement means.

54. The power measurement device of claim 53 wherein the signal generation means comprises means for sampling the second waveform.

55. The power measurement device of claim 47 further comprising receiving means for receiving the first waveform from a communications medium and to coupling samples of the first waveform to the processor, and a signal generation means for generating and coupling samples of the second waveform to the processor.

56. The power measurement device of claim 55 wherein the receiving comprises compensation means for compensating the first waveform in accordance with the second waveform.

57. The power measurement device of claim 56 wherein the compensation means is configured to compensate the first waveform for time, frequency and phase offsets with respect to the second waveform.

58. The power measurement device of claim 47 wherein the computation means is configured to compute the relative power by computing a ratio of the first and second parameters.

59. The power measurement device of claim 58 wherein the relative power computation comprises a logarithmic ratio.

60. A power measurement device, comprising:
receiving means for receiving a signal having a first plurality of channels separated in a first format, and a second plurality of channels separated in a second format different from the first format;
first measurement means for measuring a first parameter of a first one of the first channels, wherein the first measurement means is configured to measure the first parameter by computing an unnormalized cross-correlated value between an actual waveform of the first one of the first channels and an ideal waveform for at least one of the second channels that correlates with the actual waveform;
second measurement means for measuring a second parameter of a second one of the first channels; and
computation means for computing relative power between the first one of the first channels and the second one of the first channels as a function of the first and second parameters to ensure regulatory minimum performance.

61. The power measurement device of claim 60 wherein the second format comprises a code division multi-access format.

62. The power measurement device of claim 61 wherein the first format comprises a time division multi-access format.

63. The power measurement device of claim 60 wherein the first measurement means is further configured to compute the unnormalized cross-correlated value by solving the following equation:

$$\xi = \frac{\left|\sum_{k=1}^{M} z_k \cdot r_k^*\right|^2}{\sum_{k=1}^{M} |r_k|^2}$$

where:
ξ represents the unnormalized cross-correlated value between the actual waveform of the first one of the first channels and the ideal waveform that correlates to the actual waveform;
$z_k$ represents actual waveform samples from the first one of the first channels;
$r_k$ represents ideal waveform samples for at least one of the second channels that correlate with the actual waveform samples;
M represents a number of samples in the first one of the first channels used to compute; and
[ ]* represents the complex conjugate.

64. The power measurement device of claim 60 wherein the first measurement means is further configured to compute the unnormalized cross-correlated value by solving the following equation:

$$\xi = \sum_{J=1}^{N} \left\{ \frac{\left| \sum_{k=1}^{M} z_{j,k} \cdot r_{j,k}^* \right|^2}{\sum_{k=1}^{M} |r_{j,k}|^2} \right\}$$

where:
- $\xi$ represents the unnormalized cross-correlated value between the actual waveform of the first one of the first channels and the ideal waveform that correlates to the actual waveform;
- j represents an index designating an elementary unit of the actual waveform;
- k is an index designating a sample in the elementary unit;
- $z_{j,k}$ represents actual waveform samples in the $j^{th}$ elementary unit from the first one of the first channels;
- $r_{j,k}$ represents ideal waveform samples in the $j^{th}$ elementary unit for at least one of the second channels that correlate with the actual waveform samples;
- M represents a number of samples in the first one of the first channels used to compute;
- N is a summation limit designating the number of elementary units; and
- [ ]* represents a complex conjugate.

65. The power measurement device of claim 60 wherein the computation means is further configured to compute the relative power by computing a ratio of the first and second parameters.

66. The power measurement device of claim 65 wherein the relative power computation comprises a logarithmic ratio.

67. The power measurement device of claim 65 wherein the first measurement means is configured to measure the first parameter by computing an unnormalized cross-correlated value ($\xi^{ch1}$) between an actual waveform of the first one of the first channels and an ideal waveform for at least one of the second channels that correlates to the actual waveform of the first one of the first channels, and the second measurement means is configured to measure the second parameter by computing an unnormalized cross-correlated value (($\xi^{ch2}$) between an actual waveform of the second one of the first channels and an ideal waveform for said at least one of the second channels that correlates to the actual waveform of the second one of the first channels.

68. The power measurement device of claim 67 wherein the computation means is configured to compute the relative power ($\Delta$) by solving the following equation:

$$\Delta = 10 \cdot \log_{10}\left(\frac{\xi^{ch1}}{\xi^{ch2}}\right).$$

69. Computer-readable media embodying a program of instructions executable by a computer to perform a method of measuring power, the method comprising:
  measuring a first parameter as a function of first and second waveforms over a first time period, wherein the first parameter measurement comprises computing a first unnormalized cross-correlated value between the first waveform and the second waveform that correlates with the first time period;
  measuring a second parameter as a function of the first and second waveforms over a second time period, wherein the second parameter measurement comprises computing a second unnormalized cross-correlated value between the first waveform and the second waveform that correlates with the first waveform over the second time period; and
  computing relative power of the first waveform between the first and second time periods to ensure regulatory minimum performance.

70. The computer-readable media of claim 69 wherein the first and second parameter measurements each further comprises computing its respective first or second unnormalized cross-correlated value using samples of the first and second waveforms.

71. The computer-readable media of claim 70 wherein the method further comprises compensating the first waveform in accordance with the second waveform.

72. The computer-readable media of claim 71 wherein the waveform compensation comprises compensating the first waveform for time, frequency and phase offsets with respect to the second waveform.

73. The computer-readable media of claim 69 wherein the relative power computation comprises computing a ratio of the first and second parameters.

74. The computer-readable media of claim 73 wherein the relative power computation comprises computing a logarithmic ratio.

* * * * *